United States Patent [19]
Nishida

[11] Patent Number: 5,321,421
[45] Date of Patent: Jun. 14, 1994

[54] PORTABLE ELECTRONIC DEVICE CAPABLE OF RECEIVING AND TRANSMITTING LOWER-CASE LETTER CODES WHILE DISPLAYING ONLY UPPER-CASE LETTERS

[75] Inventor: Taizou Nishida, Ikoma, Japan

[73] Assignee: Sharp Kabushiki Kaisha, Osaka, Japan

[21] Appl. No.: 76,155

[22] Filed: Jun. 14, 1993

[30] Foreign Application Priority Data

Jun. 16, 1992 [JP] Japan .................................. 4-156651

[51] Int. Cl.⁵ .............................................. G09G 1/14
[52] U.S. Cl. .................................. 345/141; 340/825.44
[58] Field of Search ................. 345/1, 2, 25, 26, 141, 345/143; 455/158.5, 38.4; 340/825.44, 825.17

[56] References Cited
FOREIGN PATENT DOCUMENTS 63-283338 11/1988 Japan .

Primary Examiner—Ulysses Weldon
Assistant Examiner—Matthew Luu
Attorney, Agent, or Firm—Nixon & Vanderhye

[57] ABSTRACT

A portable electronic device can receive and transmit lower-case letter codes while it displays only upper-case letters. The device stores data received from a superior model as they are in a RAM. When data display is performed, a CPU determines whether or not each of letter codes contained in the data read out from the RAM is a lower-case letter code. If a current letter code is a lower-case letter code, then the CPU selects an upper-case letter code corresponding to the lower-case letter code and then reads out a character code corresponding to the selected upper-case letter from a ROM for display of the upper-case letter on an LCD. If a current letter code is an upper-case letter code, a character code corresponding to the upper-case letter code is read out from the ROM for display of the upper-case letter. When received data are reversely transmitted to the superior model, the original data containing the lower-case letter codes are simply transmitted as they are.

1 Claim, 5 Drawing Sheets

Fig.5 (A) PRIOR ART
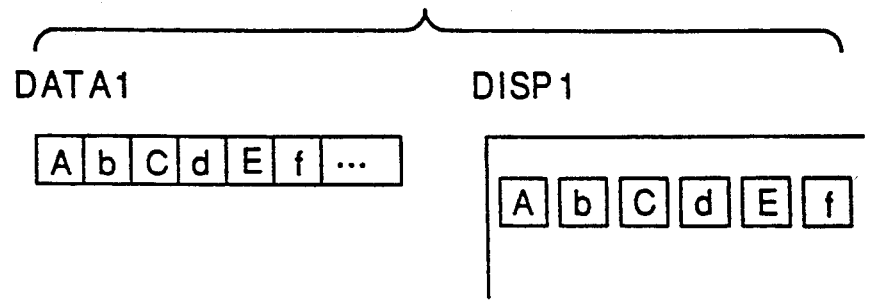
Fig.5 (B) PRIOR ART
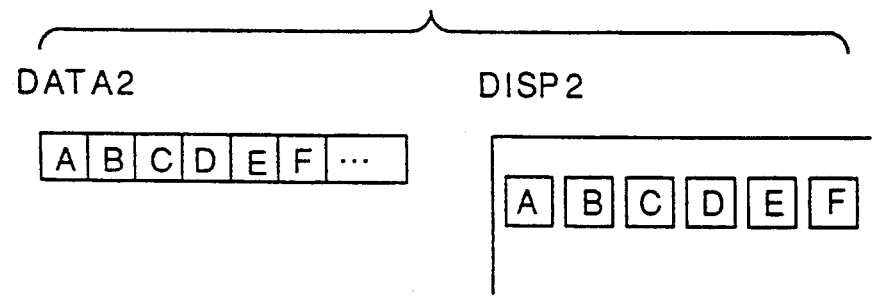
Fig.5 (C) PRIOR ART
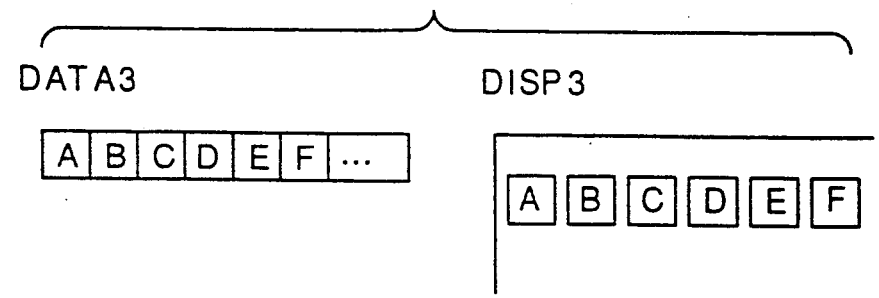

PORTABLE ELECTRONIC DEVICE CAPABLE OF RECEIVING AND TRANSMITTING LOWER-CASE LETTER CODES WHILE DISPLAYING ONLY UPPER-CASE LETTERS

BACKGROUND OF THE INVENTION

The present invention generally relates to portable electronic devices with a communication function, such as electronic notebooks and electronic memo pads, that can display upper-case letters but not lower-case letters, and more particularly to a letter data processing for such a portable electronic device for the display of data received and the reverse transmission of received data.

With a line-up of compatible products, it is often possible to connect up portable electronic devices with a communication function (such as electronic notebooks and electronic memo pads) with superior kinds of portable electronic devices and information processing devices (such as personal computers and word processors) so as to effect two-way data transmission.

Of the inferior kinds of portable electronic devices, there are some that can display upper-case letters but not lower-case letters.

Thus when data transmission is effected between a portable electronic device or information processing device of a superior kind that can display both upper-case letters and lower-case letters (referred to as a first device below) and an inferior kind of portable electronic device that can only display the alphabet in upper-case letters (referred to as a second device below), lower-case letter codes contained in data received by the second device from the first device are converted into upper-case letter codes, the data being stored after conversion.

FIGS. 5(A), 5(B) and 5(C) show an example of data contents (left side) and display contents (right side) in data transmission between the first device and the second device. The problem that the present invention attempts to resolve is to be found in the second device of an inferior kind.

It is assumed here that data containing lower-case letters are transmitted from the first device to the second device, and then the data received by the second device are reversely transmitted to the first device.

In FIG. 5(A) shows contents of original data DATA1 stored in the first device and display contents based on DATA1 on a display of the first device. The data contents include both upper-case letters and lower-case letters, which are mixed together as follows:

DATA1: [A, b, C, d, E, f]

The display contents are identical to the data contents stored:

DISP1: {A, b, C, d, E, f}

The data DATA1 are transmitted from the first device to the second device.

In FIG. 5 (B) shows the data contents received by the second device and the display state thereof. As the second device cannot display lower-case letters, lower-case letter codes contained in the data DATA1 are all converted into upper-case letter codes, that is, capitalization is performed when the data DATA1 are received, and the converted data are stored as DATA2 as follows:

DATA2: [A, B, C, D, E, F]

Namely, as the above indicates, the lower-case letter codes [b], [d] and [f] are converted into the upper-case letter codes [B], [D] and [F] respectively, and stored.

Accordingly, with the conversion of the lower-case letters into the upper-case letters, the display state of the second device becomes:

DISP2: {A, B, C, D, E, F}

Next, capitalized data DATA2 stored in the second device are reversely transmitted to the first device.

In FIG. 5. (C) shows the data contents received by the first device and the display state thereof after reverse transmission from the second device. As data have already been capitalized in the second device as described above, data received by the first device by reverse transmission become:

DATA3: [A, B, C, D, E, F]

In accordance with this data, the display state of the first device becomes:

DISP3: {A, B, C, D, E, F}

As described above, the second device such as a portable electronic device of an inferior kind, which can only display the alphabet in upper-case letters, converts lower-case letter codes received from the first device of a superior kind such as a portable electronic device or information processing device into upper-case letter codes (i.e., capitalization of the lower-case letters). The resulting problem is that the original lower-case letter codes are changed into upper-case letter codes (letter mutation) when the received data are reversely transmitted to the first device of a superior kind. Namely, in the example above, the original lower-case letter codes [b], [d] and [f] undergo letter mutation, changing into the upper-case letter codes [B], [D] and [F] respectively.

This means that it is not possible to preserve original data, and is a major problem in data transmission. In order to return the data to their original state, it is first necessary to discover which letters have undergone letter mutation. Such an operation is extremely difficult, and considerable time and effort is required to return all subject upper-case letters to lower-case letters.

SUMMARY OF THE INVENTION

The object of the present invention is therefore to provide a portable electronic device that can display upper-case letters but not lower-case letters, wherein when lower-case letter codes are received from another, superior kind of portable electronic device or information processing device, and the received data is transmitted back to the superior device, capitalization (letter mutation) of lower-case letter codes is not effected, thus making possible the preservation of data.

In order to accomplish the above object, in a portable electronic device that can display upper-case letters but not lower-case letters according to an embodiment of the present invention, data received from another, superior device by a communication means are not subjected to any conversion and stored as they are in a memory means. Before the device of the present invention displays the data once stored, a determining means determines whether or not each of letter codes contained in the data stored in the memory means is a lower-case letter code. When the determining means determines that a certain letter code is a lower-case letter code, a selecting means selects an upper-case letter code corresponding to the lower-case letter code, and a display means displays n upper-case letter based on the selected upper-case letter code. Thus, all letters are displayed solely in the form of upper-case letters. When a reverse data transmission to the another, superior device is performed, the communication means transmits the data stored in the memory means without performing any conversion to them.

As described above, in the portable electronic device of the present invention, even if data received contains lower-case letter codes, the data are stored in the state they are in, including the lower-case letter codes, and capitalization is effected with the data read out from the memory means only before display is effected. Accordingly, when the received data are transmitted back to a superior model, it is possible to perform a reverse transmission without letter mutation and thus preserve the original data completely intact.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(A), 5(B) and 5(C) show an example of data contents (left side) and display contents (right side) with data transmission in a conventional example.

DETAILED DESCRIPTION OF THE INVENTION

Figure 1:
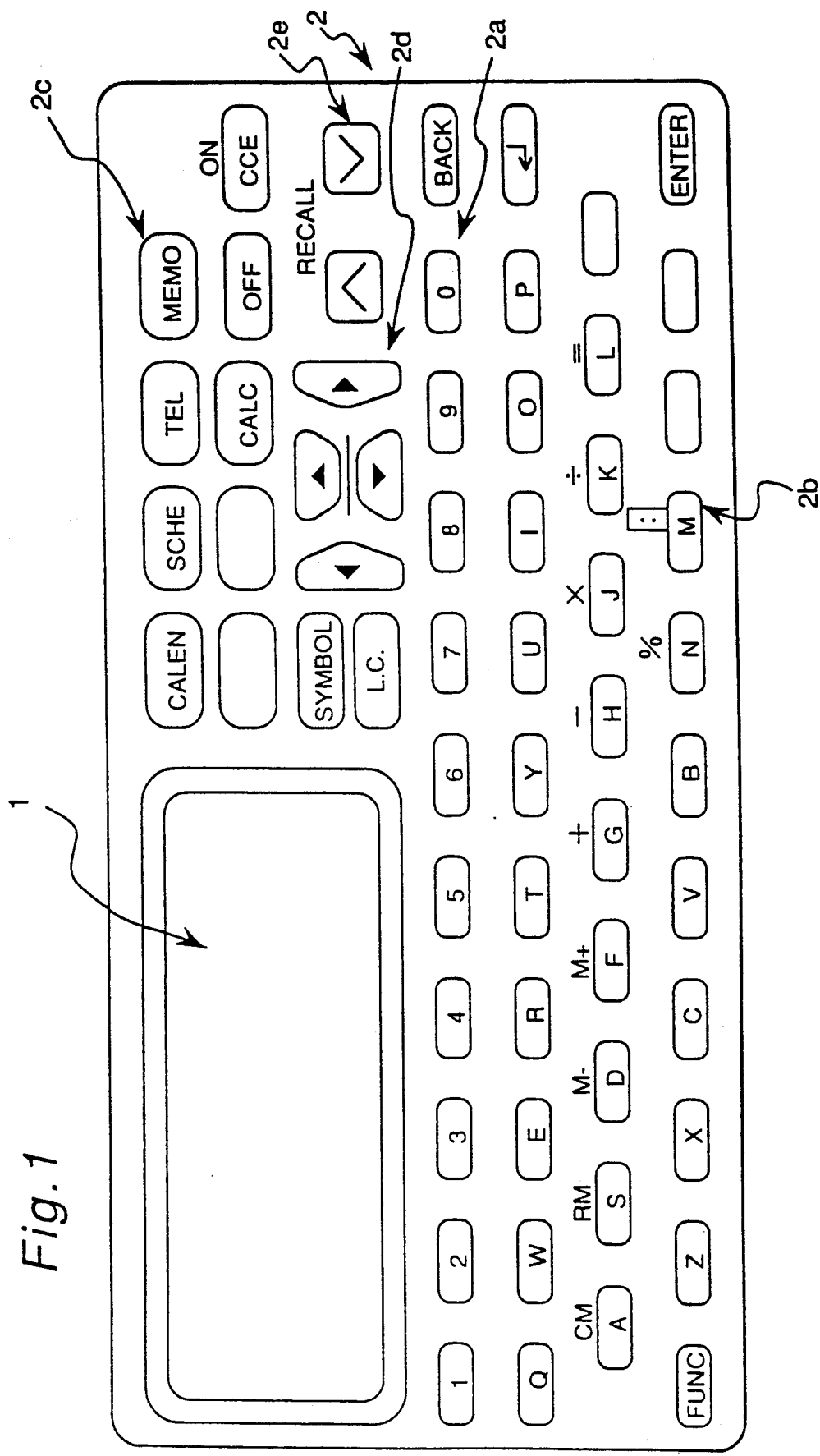
FIG. 1 is a plan view showing the exterior of a portable electronic device (an electronic memo pad) according to an embodiment of the present invention.

FIG. 1 is a plan view showing the exterior of a portable electronic device (an electronic memo pad) with a liquid crystal display 1 (LCD) as an embodiment of the present invention. As an example of its specifications, the space for one character is 5×5 dots, and the display is composed of a 14 column/3 row dot matrix. The portable electronic device is provided with a key input portion 2 wherein there are digit keys 2a for the numerals "0" through "9", letter input keys 2b for the letters "A" through "Z", mode selection keys 2c for selecting memo pad, calendar, schedule book and telephone directory modes, cursor keys 2d, and data recall keys 2e.

Figure 2:
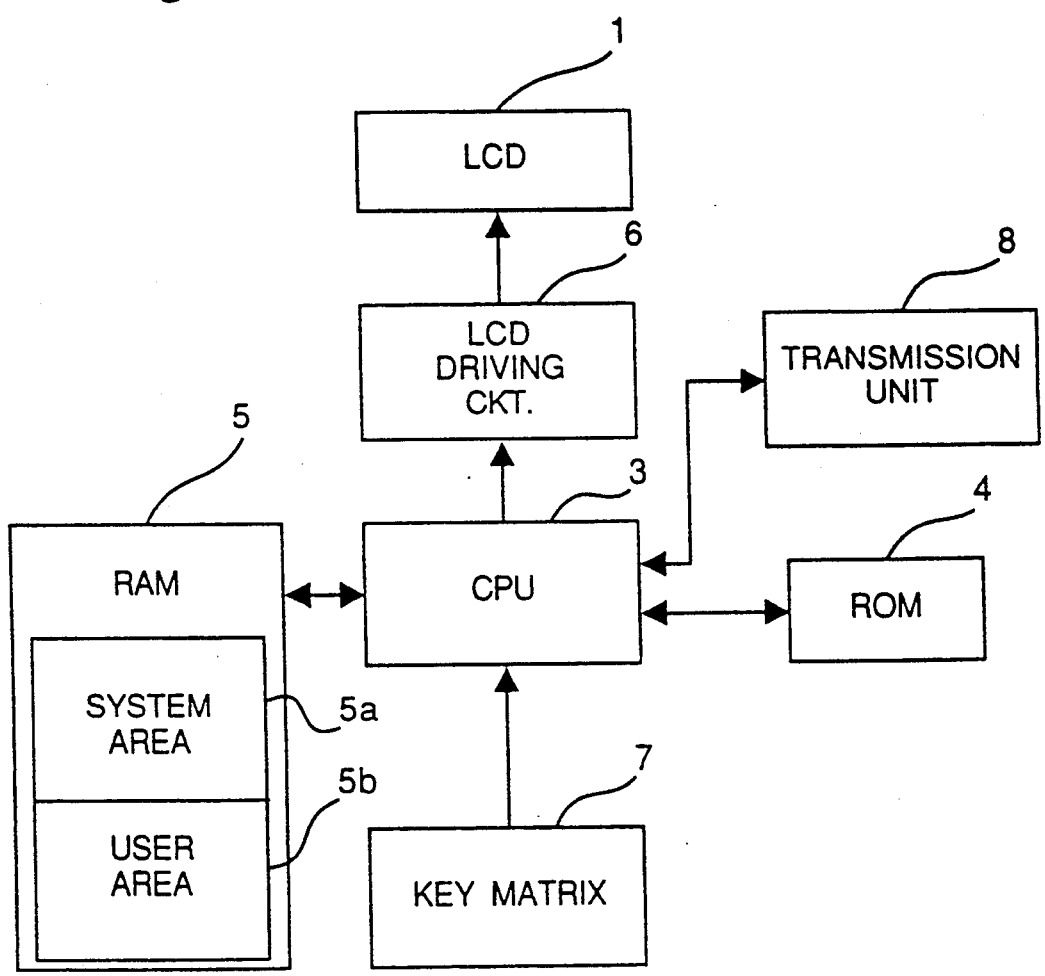
FIG. 2 is a block diagram of the portable electronic device of FIG. 1.

FIG. 2 is a block diagram showing the electrical construction of the portable electronic device (electronic memo pad). As shown in this figure, the portable electronic device is provided with a CPU 3 (Central Processing Unit) for directing control of the entire portable electronic device, a ROM 4 (Read Only Memory) for housing the control program and various font data including character codes corresponding to upper-case letter codes, and a RAM 5 (Random Access Memory) for providing control back-up, as well as storing data. The RAM 5 is broadly divided into a system area 5a, which has a register for storing flags used for control and is used in internal arithmetic operations, and a user area 5b for storing various memo pad and telephone directory data recorded by a user. Also shown are an LCD driving circuit 6 for effecting drive control of the LCD 1, a key matrix 7 for generating signals when touched by corresponding keys in the key input portion 2 and transferring the signals to the CPU 3, and a transmission unit 8 which serves as an interface for effecting two-way data transmission between the present device and another device.

Figure 3:
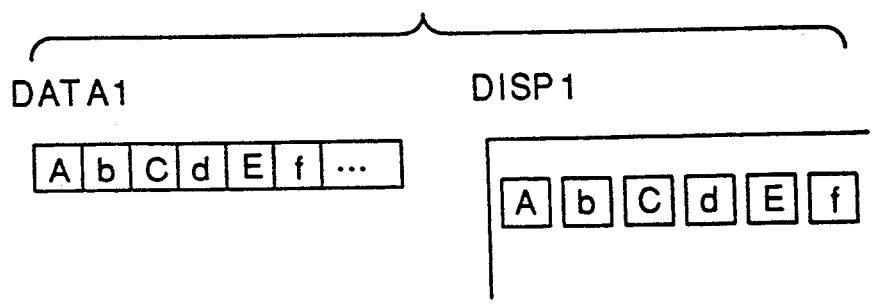
FIGS. 3(A), 3(B) and 3(C) show an example of data contents (left side) and display contents (right side) with data transmission between the portable electronic device of the present invention and another, superior device, wherein (A) shows original data contents and display contents in the superior device, (B) shows data contents received from the superior device and display contents in the portable electronic device of the present invention, and (C) shows data contents received from the device of the present invention and display contents in the superior device.
Figure 3:
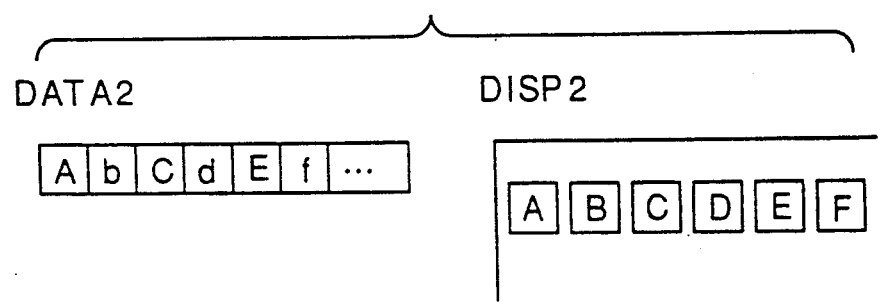
Figure 3:
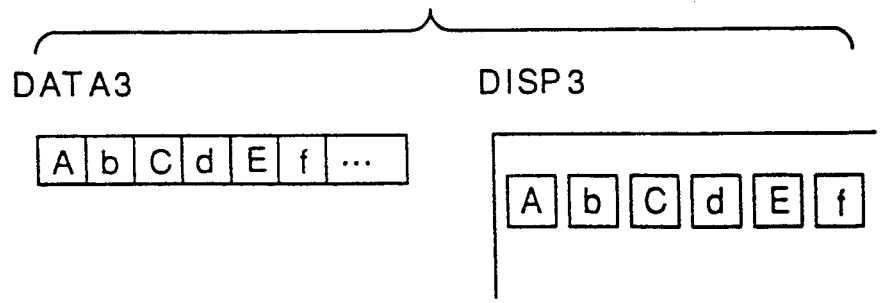

The following is a description of the operation of the present embodiment referring to FIGS. 3(A), 3(B) and 3(C).

It is now assumed that data shown in FIG. 3(A), for example, are transmitted from a superior kind of portable electronic device or information processing device to the portable electronic device of the present embodiment. The data consist of upper-case letter codes and lower-case letter codes mixed together as follows:

DATA1: [A, b, C, d, E, f]

The display state of the display in the superior model is identical to the data DATA1 as follows:

DISP1: {A, b, C, d, E, f}

When the CPU 3 in the portable electronic device of the invention receives the data DATA1 from the superior model via the transmission unit 8, the data received are stored in the user area 5b of the RAM 5 as they are, and do not undergo capitalization, even if they contain lower-case letter codes.

As shown in FIG. 3(B) at the left side, the data contents received from the superior model and stored in the RAM 5 are as follows:

DATA2: [A, b, C, d, E, f]

That is to say, the lower-case letter codes [b], [d] and [f] are stored as they are.

Figure 4:
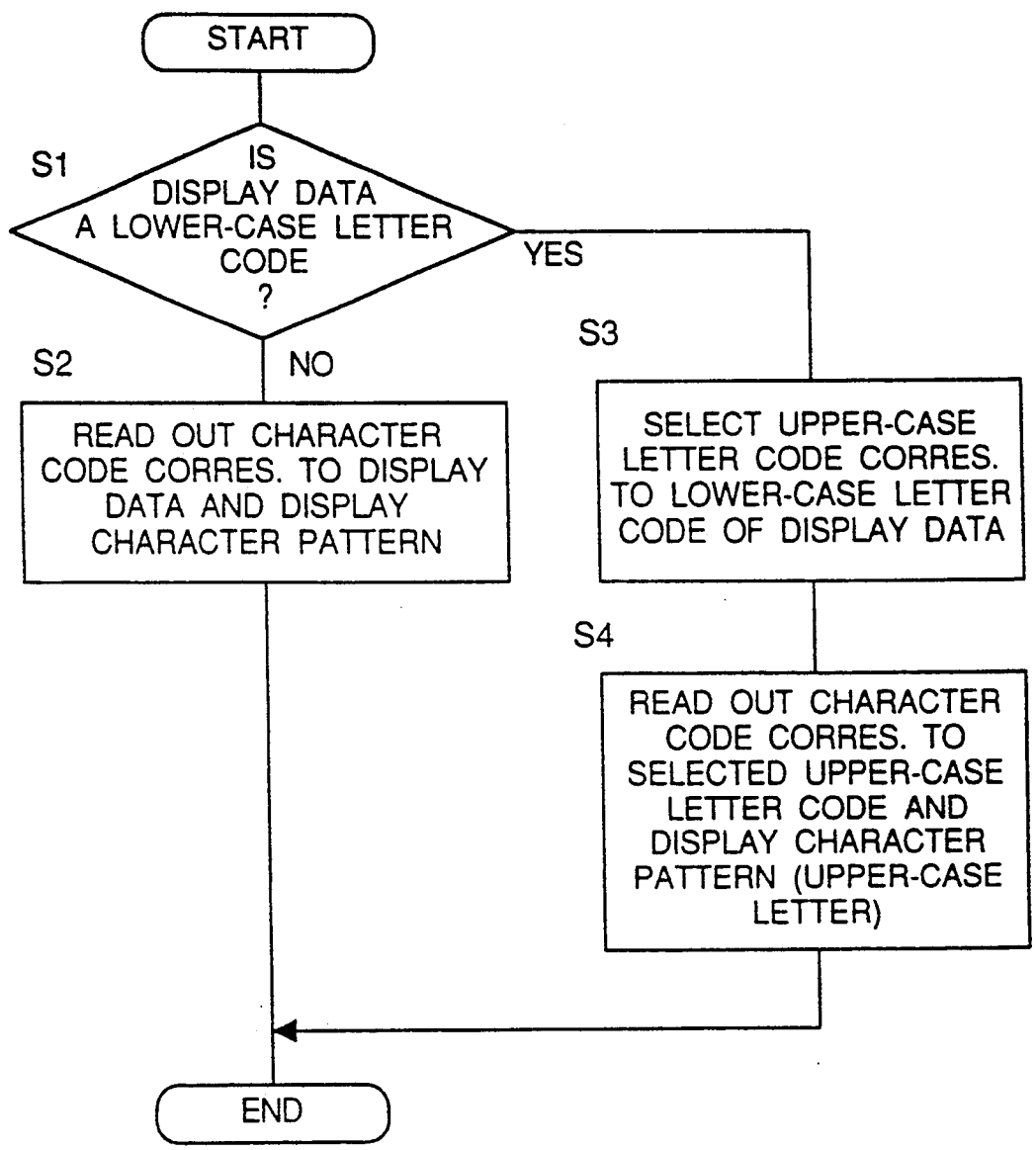
FIG. 4 is a flow chart for the description of display processing operations in the embodiment of the present invention.

Processing when the data stored in the RAM 5 is recalled and displayed on the LCD 1 is effected as in the flow chart shown in FIG. 4. Namely, the CPU 3 determines at Step S1 whether each of letter codes contained in the data (display data) read out from the RAM 5 is a lower-case letter code. If a current letter code is not a lower-case letter code but an upper-case letter code, the CPU 3 proceeds to Step S2, outputs the current upper-case letter code to the ROM 4 to read out a character code corresponding to the upper-case letter code from the ROM 4, and transfers the character code to the LCD driving circuit 6. A character pattern (an upper-case letter) is finally displayed on the LCD 1 on the basis of the character code read from the ROM 4. It is to be noted that codes of the display data other than letter codes are also processed at steps S1 and S2.

However, if it is determined at Step S1 that a current letter code is a lower-case letter code, the CPU 3 proceeds to Step S3, at which the CPU 3 selects an upper-case letter code corresponding to the current lower-case letter code from a set of upper-case letters stored beforehand in a CPU internal memory (not shown) or the RAM 5 and outputs the selected upper-case letter to the ROM 4. Then at step S4, the CPU reads out a character code corresponding to the selected upper-case letter from the ROM 4. Namely, the lower-case letter code is capitalized. The character code corresponding to the upper-case letter code is then transmitted to the LCD driving unit 6, so that the LCD 1 displays a character pattern (an upper-case letter) on the basis of the character code selected.

In accordance with the conversion to upper-case letters, the display state of the LCD 1 becomes:

DISP2: {A, B, C, D, E, F}

Namely, the lower-case letter codes [b], [d] and [f] are converted to the upper-case letter code character patterns {B}, {D} and {F} respectively, and displayed.

As is evident from the foregoing, DISP2, the contents of data displayed on the LCD 1, and DATA2, the contents of data stored in the RAM 5, differ in form, and while the display contents DISP2 are solely upper-case letters in accordance with the specifications of the portable electronic device, the stored contents DATA2 of the RAM 5 are as transmitted from the superior model, with the lower-case letter codes left as they are.

The following is a description of operations when data received by the portable electronic device of the present embodiment from the superior model are reversely transmitted to the superior model. The CPU 3 reads out the received data DATA2 from the RAM 5, which are then transmitted to the superior model via the transmission unit 8, without undergoing any conversion. As shown in FIG. 3(C), data read out from the RAM 5 contain the lower-case codes [b], [d] and [f] as follows:

DATA3: [A, b, C, d, E, f]

Accordingly, when the data that have been reversely transmitted are displayed in the superior model, the display contents become:

DISP3: {A, b, C, d, E, f}

Namely, notwithstanding the fact that the portable electronic device of the invention does not have the function of displaying lower-case letters, and so can only display upper-case letters, data transmission can be effected between the portable electronic device of the invention and a superior model without letter mutation. It is therefore possible to preserve data completely intact. There is none of the trouble of determining which letters have undergone letter mutation, which arises when processing by letter mutation, as in the conventional example, and it is thus possible to increase workability and the efficient utilization of data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electronic device that can display upper-case letters but not lower-case letters, comprising:
   communication means for receiving data from and transmitting data to another device;
   memory means for storing said data received by said communication means, said data not being subjected to any conversion;
   determining means for determining whether or not each of letter codes contained in said data received by said communication means and stored in said memory means is a lower-case letter code before said data are displayed;
   selecting means for selecting an upper-case letter code corresponding to said lower-case letter code when said determining means determines that a certain letter code is said lower-case letter code; and
   display means for displaying an upper-case letter based on said selected upper-case letter code,
   said communication means transmitting said data stored in said memory means to said another device without performing any conversion to said lower-case letter code.

* * * * *